United States Patent [19]

Spengler et al.

[11] 4,149,446
[45] Apr. 17, 1979

[54] LOAD INDICATOR WASHER

[75] Inventors: Emerson D. Spengler; Charles W. Schaeffer, both of Lebanon, Pa.

[73] Assignee: Bethlehem Steel Corporation, Bethlehem, Pa.

[21] Appl. No.: 856,815

[22] Filed: Dec. 1, 1977

[51] Int. Cl.² ............................................. F16B 31/02
[52] U.S. Cl. ........................................................ 85/62
[58] Field of Search ....................... 85/61, 62; 151/38; 73/88 R

[56] References Cited

U.S. PATENT DOCUMENTS

| | | | |
|---|---|---|---|
| 1,774,695 | 9/1930 | Baynes | 85/62 |
| 2,850,937 | 9/1958 | Ralston | 85/62 |
| 2,943,528 | 7/1960 | Curry | 85/62 |
| 3,104,645 | 9/1963 | Harrison | 116/114 R |
| 3,150,557 | 9/1964 | Brown | 85/62 |
| 3,169,440 | 9/1965 | Taylor | 85/62 |
| 3,329,058 | 7/1967 | Cumming | 85/62 |
| 3,332,464 | 7/1967 | Castel | 151/38 X |

FOREIGN PATENT DOCUMENTS

| | | | |
|---|---|---|---|
| 964942 | 3/1975 | Canada | 85/62 |
| 619160 | 9/1935 | Fed. Rep. of Germany | 151/38 |

Primary Examiner—Thomas J. Holko
Attorney, Agent, or Firm—Joseph J. O'Keefe; Michael J. Delaney

[57] ABSTRACT

A load indicator washer in the form of a parallelogram includes flat bearing surfaces on one of its faces, the bearing surfaces extend inwardly from two opposite ends of the washer, a slightly arcuate portion extends between and connects the bearing surfaces, a hole to receive a fastener extends through the washer at about the midpoint of the washer, and a conical portion symmetrically positioned about the hole, terminating short of the ends of the washer, and extending outwardly from the arcuate portion. The arcuate portion and the conical portion act as springs, deflect under a load, and thereby indicate such load. The load indicator washer is particularly adapted for use with a mine roof bolt.

4 Claims, 7 Drawing Figures

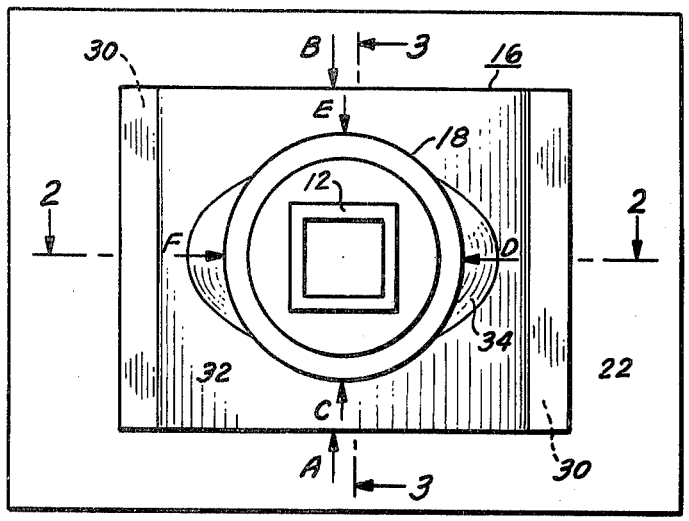
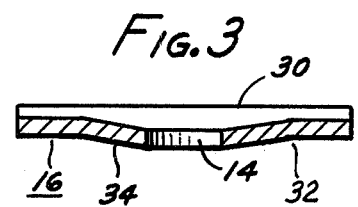
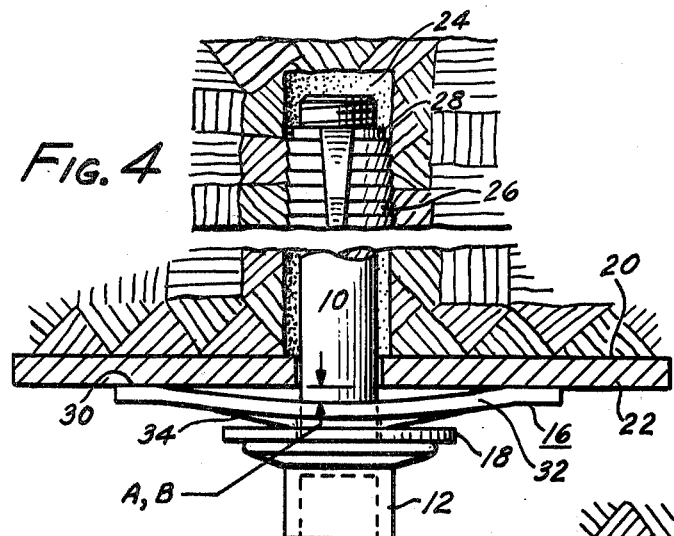
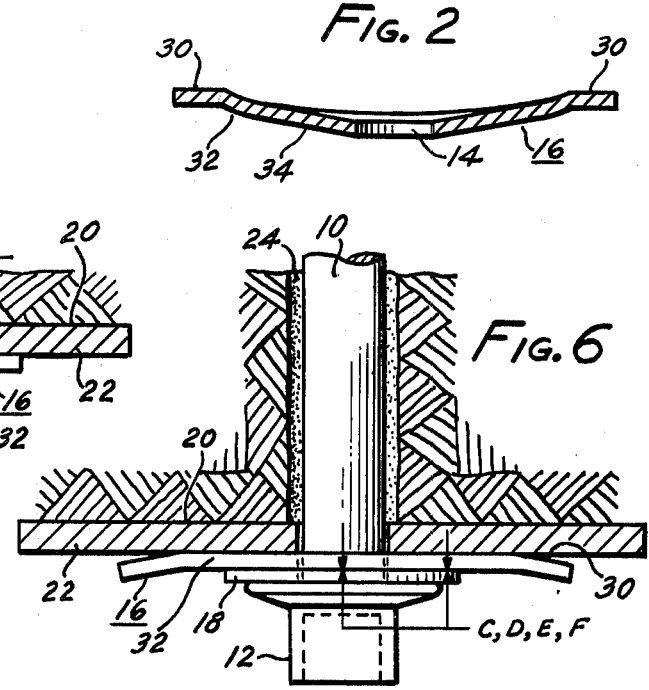
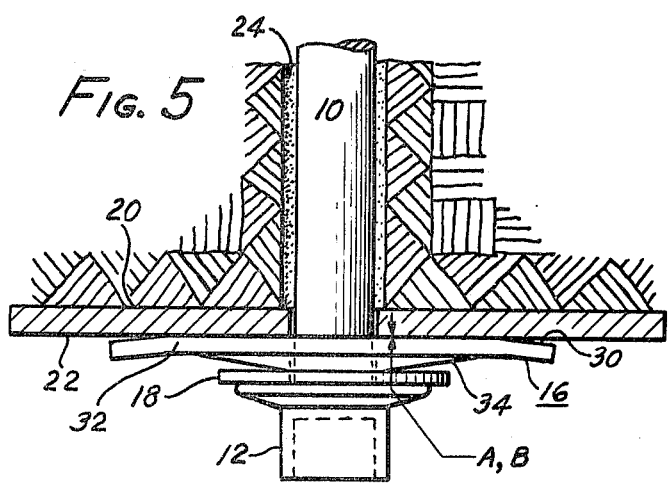
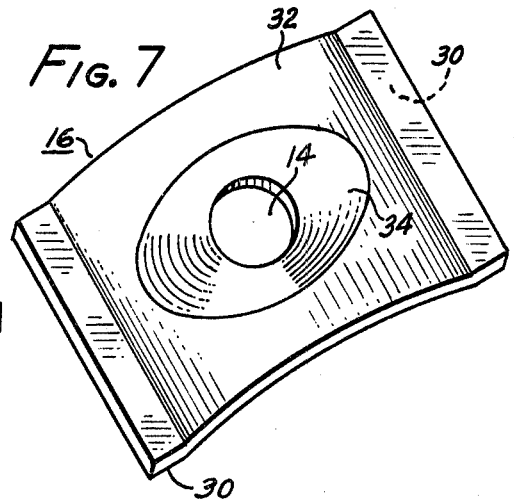

LOAD INDICATOR WASHER

BACKGROUND OF THE INVENTION

This invention is directed generally to a load indicator washer and in particular to a load indicator washer for use with a mine roof bolt.

Load indicator washers for use with mine roof bolts are broadly old as disclosed, for example, in U.S. Pat. Nos. 3,104,645 to Harrison (1963) and 3,150,557 to Brown (1964).

Harrison discloses a bolt stress indicator which indicates excessive stress imparted to a bolt by an extrusion and resulting deflection of cantilevered flags disposed between the mine roof ceiling and the supporting bolt.

Brown discloses a bolt loading indicator having obliquely set flats whose position is changed as a load is applied to a bolt which extends through the indicator.

SUMMARY OF THE INVENTION

It is an object of this invention to provide an economical load indicator washer which is particularly adapted for use with a mine roof bolt.

It is another object of this invention to provide a load indicator washer capable of affording mine personnel relatively accurate indication of the performance level of their fastener system.

The above objects can be obtained by providing a load indicator washer in the form of a parallelogram including on one face bearing surfaces which extend inwardly a short distance from two opposite ends of the washer. The bearing surfaces extend in substantially the same plane and are adapted to bear against a generally planar surface. An arcuate portion extends between the bearing surfaces and acts as a spring. Located at about the intersection of the axes of the washer is a hole to allow a bolt to pass through the washer. Symmetrically disposed about the hole is a concial portion which extends above the outermost surface of the arcuate portion and terminates short of the ends of the washer such that this conical portion also acts as a spring. The relative deflection of the arcuate portion and the conical portion indicates the load which is applied to a mine roof bolt or other fastener means used in combination with the washer.

BRIEF DESCRIPTION OF THE DRAWINGS

FIG. 1 is a plan view of the load indicator washer used in combination with a mine roof bolt.

FIG. 2 is a view taken along the lines 2—2 of FIG. 1 showing only the load indicator washer.

FIG. 3 is a view similar to FIG. 2 except taken along the lines 3—3 of FIG. 1.

FIG. 4 is a view partly in cross section showing the load indicator washer in combination with a mine roof bolt installed in a mine roof with a minimum load applied to the mine roof bolt.

FIG. 5 is a view similar to FIG. 4 except that a normal load has been applied to the mine roof bolt.

FIG. 6 is also a view similar to FIG. 4 except that a maximum load has been applied to the mine roof bolt.

FIG. 7 is an isometric view of the load indicator washer.

DETAILED DESCRIPTION OF THE DRAWINGS

Referring to FIGS. 1 and 4 a mine roof bolt 10 having a head 12 extends through a hole 14 in a load indicator washer 16. Positioned between the underside of head 12 and one face of load indicator washer 16 is a standard hardened round washer 18. Positioned between the other face of load indicator washer 16 and the roof 20 of a mine is a flat bearing plate 22. The mine roof bolt 10 is secured to the hole 24 in the mine roof 20 by a mine roof shell 26 and plug 28 in threaded engagement with the mine roof bolt 10.

As best shown in FIGS. 2, 3 and 7 the load indicator washer 16 is in the form of a plate having on one face a pair of flat bearing surfaces 30 adjacent two opposite ends of the plate. Bearing surfaces 30 are adapted under no load conditions to bear against bearing plate 22. The surfaces 30 extend transversely of the plate and inwardly a short distance from two opposite ends of the plate. Surfaces 30 extend in a common plane and are connected by arcuate portion 32 which also extends transversely of the plate. A hole 14 extends through the plate at the intersection of the longitudinal axis of the plate, which coincides with section line 2—2 of FIG. 1, and the transverse axis of the plate, which coincides with section line 3—3 of FIG. 1. As best shown in FIG. 7 a conical portion 34 is symmetrically disposed about hole 14 and in a top view has an elliptical configuration with the long axis of the configuration extending along the longitudinal axis of the plate.

SPECIFIC EXAMPLE

By way of example and not by way of limitation, a load indicator washer was designed and made for a normal mine roof bolt tension load of 6,000 pounds. The approximate dimensions for the 6,000 pound load indicator washer were as follows:

width = 2¾ inches
length = 4 inches
thickness = 0.156 inch
radius of arcuate portion = 5 inches
width of bearing surfaces = ⅜ inch
included angle of conical portion = 160°
length of conical portion along longitudinal axis = 2¼ inches
width of conical portion along transverse axis = 1⅝ inches
maximum height of conical portion above the arcuate portion = 5/64 inch
hole size = 13/16 inch In addition a load indicator washer was designed and made for a normal mine roof bolt tension load of 9,000 pounds. The thickness of the washer for the 9,000 pound load indicator washer was 0.188 inches. All other dimensions for the 9,000 pound load indicator washer were approximately as given above for the 6,000 pound load indicator washer.

The material used in cold forming the above 6,000 and 9,000 pound load indicator washers was C-1095 spring steel. After cold forming the washers were heat treated to about 48–52 Rockwell C. Thereafter, each washer was placed in a press and flattened to pre-set the washer and remove any permanent deformation so that under field loading conditions the washer acts consistently as a spring.

OPERATION

The Code of Federal Regulations Title 30 Section 75.200-7 establishes that for a normal installed bolt tension load of 6,000 pounds a tolerance of ±1,000 pounds is permitted. In addition, the maxmimum load for the normal installed load of 6,000 pounds is the maximum normal installed load of 7,000 times 150% which equals 10,500 pounds. Likewise, the minimum load for normal installed load of 6,000 pounds is the minimum normal installed load of 5,000 pounds times 70% which equals 3,500 pounds. The same Code of Federal Regulations establishes in like manner a minimum load of 5,600 pounds and a maximum load of 15,000 pounds for a normal bolt tension load of 9,000 pounds.

In operation and when either the 6,000 pound or the 9,000 pound normal bolt tension load indicator washer 16 is used with a ⅝ inch diameter mine roof bolt, a two inch round hardened washer 18 is placed between the indicator washer 16 and the head 12 of the mine roof bolt 10. Positioned between the indicator washer 16 and the roof 20 of the mine is a bearing plate 22 which is sized to allow bearing surfaces 30 to bear against it.

As is known in the art, the bolt 10 is then rotated to allow plug 28 to expand shell 26 into engagement with the sides of hole 24 in mine roof 20. Once the shell 26 is firmly secured to the sides of the mine roof hole 24, a load begins to be applied to the mine roof bolt 10 and in turn such load is applied to the indicator washer 16. Firstly, the arcuate portion 32 of the indicator washer 16 begins to deflect or straighten out. The indicator washers of the above examples were designed such that when about the above minimum loads were applied to the mine roof bolt 10 a 0.010 inch feeler gage would just fit in the gage spaces indicated as gaging points A and B as shown in FIGS. 1 and 4. The gage points or spaces A and B are the spaces between the arcuate portion 32 and bearing plate 22 where the transverse axis of the indicator washer 16 intersects the sides of the washer 16. As the bolt load increased the arcuate portion 32 continued to deflect or straighten out until when about the above normal loads were reached a 0.004 inch feeler gage would not enter the spaces indicates as A and B as shown in FIGS. 1 and 5. As the bolt load was further increased the concial portion 34 began to deflect inwardly until a 0.004 inch feeler gage would not enter two of the four gaging points C, D, E and F. As best shown in FIG. 1 and FIG. 6 gaging points or spaces C and E are the spaces between the indicator washer 16 and the hardened steel washer 18 along the transverse axis of the washer 16 while gaging points D and F are like spaces along the longitudinal axis of the washer 16.

Thus, there is provided a load indicator washer which can be used to readily indicate a minimum, a normal and a maximum bolt tension load. Furthermore, the load indicator washer allows for visual indication of the maximum load by merely observing that the round washer 18 is flat against the indicator washer 16.

It will be apparent to persons skilled in the art that the specific embodiments disclosed herein are primarily by way of example and other arrangements could be provided. Thus, this invention is not limited to the exact and specific particulars disclosed, but may also include such substitutes, modifications, or equivalents as are included within the scope and spirit of the invention and pointed out in the appended claims.

We claim: said

1. A load indicator washer comprising
    (a) a plate having on one face thereof bearing surfaces extending inwardly from two opposite ends of said plate,
    (b) said bearing surfaces extending in substantially the same plane and adapted to bear against a generally planar surface,
    (c) an arcuate portion connecting said bearing surfaces,
    (d) a hole extending through said arcuate portion of said plate at approximately the intersection of the axes of said plate, and
    (e) a conical portion extending away from said one face and outwardly from said arcuate portion and symmetrically disposed about said hole whereby as a load is applied to the washer the arcuate portion first begins to straighten out and as the load is increased the conical portion deflects toward said one face.

2. The load indicator washer of claim 1 wherein said conical portion has an elliptical configuration with the long axis of the configuration extending along the axis of the plate which passes through said bearing surfaces.

3. In combination with the load indicator washer of claim 1, a mine roof bolt passing through said hole and secured to a hole in a mine roof, the head of the mine roof bolt bearing against a hardened steel washer which in turn bears against the outer surface of said conical portion, and a bearing plate in contact with the roof of a mine, said bearing plate being also in contact with said bearing surfaces of the load indicator washer whereby under the normal design load for said mine roof bolt the arcuate portion is substantially flat against said bearing plate and under the maximum permissible tension load for said mine roof bolt the hardened steel washer is substantially flat against the indicator washer and said arcuate portion is substantially flat against said bearing plate.

4. The combination of claim 3 wherein sid conical portion has an elliptical configuration with the long axis of the configuration extending along the axis of the plate which passes through said bearing surfaces.

* * * * *